Sept. 28, 1926. Re. 16,434
E. V. SHALEN ET AL
STRETCHING APPARATUS
Original Filed March 16, 1922
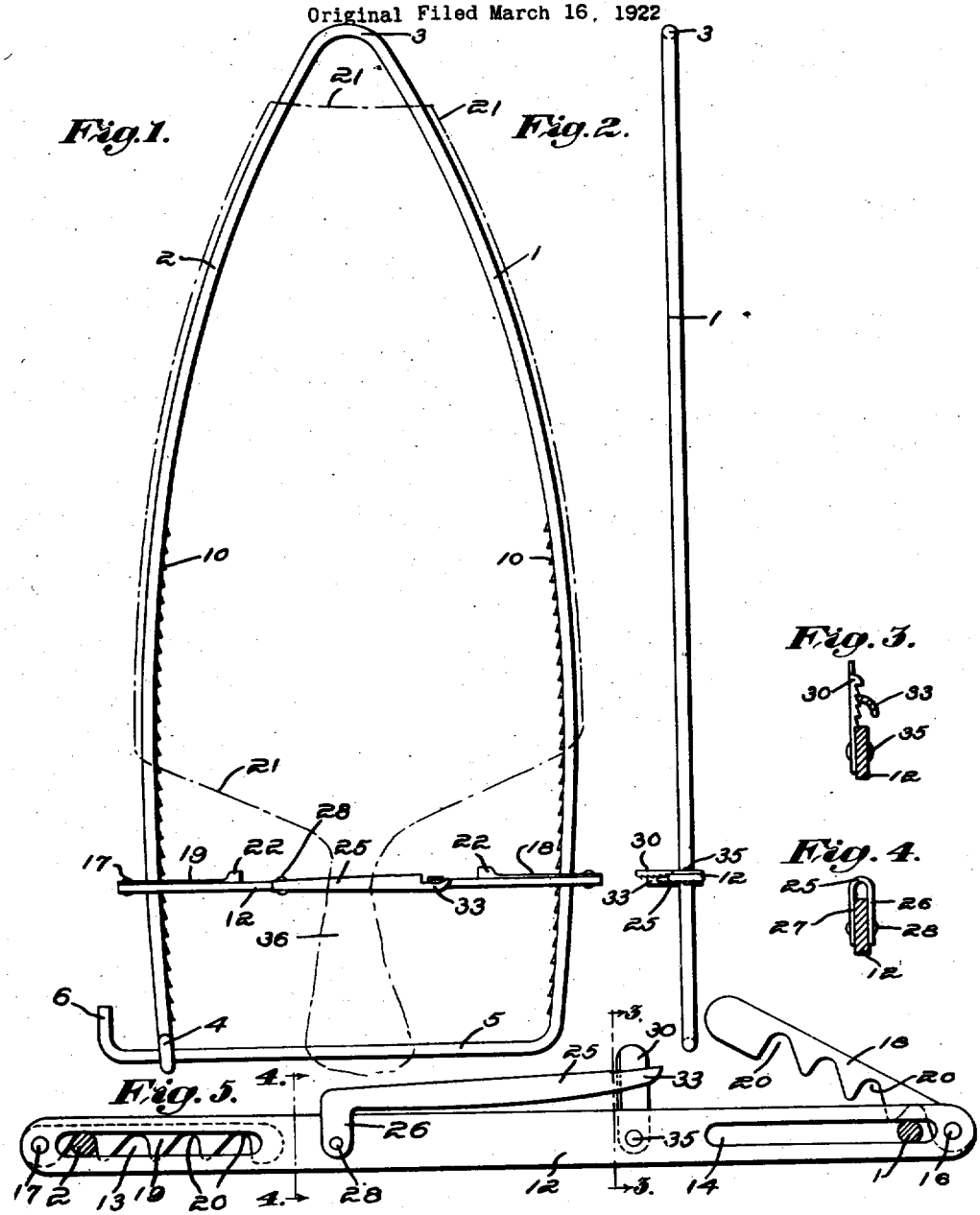
Inventors:
Ernest V. Shalen,
Carl R. Olofsson,
Bror L. Olofsson,
by Emery Booth Janney & Varney
Attys.

Reissued Sept. 28, 1926. Re. 16,434

UNITED STATES PATENT OFFICE.

ERNEST V. SHALEN, KARL R. OLOFSSON AND BROR L. OLOFSSON, OF BOSTON, MASSACHUSETTS, ASSIGNORS TO KAKAS BROS., INC., OF BOSTON, MASSACHUSETTS, A CORPORATION OF MASSACHUSETTS.

STRETCHING APPARATUS.

Original No. 1,494,637, dated May 20, 1924, Serial No. 544,353, filed March 16, 1922. Application for reissue filed February 24, 1925. Serial No. 11,384.

Our present invention relates to devices for use in holding, stretching and drying pelts, skins and the furs of fur-bearing animals, particularly small fur-bearing animals as a preliminary step in subsequent use and manufacture in the making of garments.

In prior stretching devices of this general type, numerous attempts have been made to provide a wire or metal frame on which the pelt or skin could be stretched, but such prior devices have been unsatisfactory in actual use, because of the difficulty in handling them, time required to apply, attach, hold and stretch the pelt, injury resulting to the fur of the pelt, and similar objections, so that in actual use, it is preferable to employ a series or set of boards, on which the pelts are applied, stretched and tacked in shape.

Our present invention is directed to obviate the difficulties of prior wire or metal stretching appliances and to be as acceptable and capable in actual use to the present practice of using the boards, while also eliminating the danger and injury to the pelts by doing entirely away with tacks or other securing means which will in any way deteriorate or damage the fur.

We have combined in a spring form of metal holder and stretcher, attaching and adjustable apparatus which enables great speed of operation, affords rigidity and uniform tension on the skins while drying, is capable of a wide range of adjustability and therefore can handle small and large skins up to the limit of its length, and permits a quick, efficient and positive locking of the stretching devices.

Further features and advantages and novel details of construction will be hereinafter more fully pointed out and claimed.

Referring to the drawings, illustrating a preferred embodiment of our invention, Fig. 1 is a plan view of our improved metallic stretcher illustrating a skin of substantially the largest length and capacity for which the apparatus is adapted;

Fig. 2 is a side view of the apparatus;

Fig. 3 is a cross-sectional view on the line 3—3 of Fig. 5;

Fig. 4 is a cross-sectional view on the line 4—4 of Fig. 5; and

Fig. 5 is an enlarged side view of the adjustable cross-bar.

In carrying out our invention any suitable length of metal and diameter of the same can be employed. Preferably we would provide a set of three or possibly four frames of varying sizes to take care of the entire range of skins and pelts for any particular work, each one of these frames being capable in itself to handle, hold and stretch a considerable range of pelts. We also prefer to use a round spring wire, forming the same as illustrated in Fig. 1, with the sides 1 and 2 springing from the apex 3, and in a curved form with the shorter arm 2 formed with an eye-loop 4 and the longer arm 1 having its endmost portion bent transversely as shown at 5, passing through the loop 4 in the short arm 2 and ending in a short upturned end 6 which acts as a stop and partly as a handle. The inner surfaces of these sides 1 and 2 are provided with a series of notches as indicated at 10, 10. These notches may be formed in any suitable manner, but preferably are simply recesses filed or formed on the inner surfaces of the side arms 1 and 2, substantially as shown.

Applied to the sides 1 and 2 is a sliding cross-bar 12 having thereon means to hold and retain the tail portion of the pelt to effect the longitudinal stretching and also having means to lock the cross bar 12 in adjusted position, both longitudinally and cross-wise with relation to the sides 1 and 2. For this purpose the cross-bar 12 has formed therein slots 13 and 14 of substantial length and sufficient diameter to span the sides 1 and 2, to slide freely thereover. In order to firmly and positively lock the cross-bar 12 to the sides 1 and 2, both longitudinally for stretching the skin lengthwise, and laterally for stretching the skin widthwise, we attach to the extreme ends of the cross-bar 12 at 16 and 17, notched locking levers 18 and 19 respectively, each lever having a series of notches 20 of appropriate form and diameter to catch over the sides 1 and 2 and engage the notches 10, holding the sides 1 and 2 both extended to the limit of the stretching capacity of the pelt 21 being applied, while also holding the same stretched longitudinally, as will be readily appreciated. These locking levers are also fitted with a small finger clip or catch 22 to facilitate releasing or raising the levers and remove the tension of the cross-bar 12 and sides 1 and 2 after the skin is stretched and it is desired to remove the same.

It is necessary to apply to the tail piece of the pelt being stretched, a fastening means which will firmly retain the same and yet will not injure the fur. As these pelts when applied to the stretching frame are green and very slippery it has heretofore been extremely difficult to secure the tail piece with any non-slipping fastening device which would not injure the fur. In the use of a board where tacks were employed the fur was injured but slightly, but in our invention we have devised a novel fastening means which does not perforate the fur in any way, which will hold it securely, firmly and rigidly, and enable the entire skin to be stretched longitudinally when applied to the frame. This fastening device comprises a channel or U-shaped member 25 adapted to partially enclose the cross-bar 12 when the fastener 25 is moved downwardly into fur engaging position, thus clamping the fur firmly and in an S-shaped path around the top of the cross-bar 12. This clamping member 25 has a pair of rearwardly extending lugs 26 and 27 pivoted to the cross-bar 12 at 28, and at the forward part is formed to receive a notched catch 30, as clearly shown in Fig. 3, a portion of the channel or arm of one side being removed to constitute the cooperating catch engaging member 33. This catch 30 is preferably pivoted at 35 to the cross-bar 12 as also clearly illustrated in Figs. 3 and 5.

In the operation of our improved stretching frame, the operator holds the same by the curved or bottom portions, viewing Fig. 1, fits the pelt 21 over the apex 3 and pulls the pelt into approximate position, thereupon attaching the cross-bar to the tail 36 of the pelt 21, clamping the tail piece firmly to the cross-bar by swinging the fastener 25 downwardly and retaining the same in position by engaging the catch 30, so that the teeth therein will engage and hold the end portion 33 of the fastener 25. Thereupon the operator expands the sides 1 and 2 and simultaneously moves the cross-bar 12 rearwardly to stretch the pelt longitudinally, and when in desired adjusted position, the operator snaps downwardly the arms 18 and 19 which engage the sides 1 and 2 in the adjacent notches 10, thus holding the pelt and frame in extreme stretched position to which the same has been adjusted, both widthwise and lengthwise. The peculiar configuration of the fastener 25 cooperating with the cross-bar 12 giving a firm, rigid and yet non-marring grip on the tail of the pelt while holding the same in stretched position and yet can be instantly released after the pelt is cured and it is desired to remove the same. Similarly the locking arms 18 and 19 can be quickly lifted by engagement with the finger clips 22 and the tension from the pelt instantly released both cross-wise and longitudinally.

In using our improved frame a pelt can be applied as quickly as has been possible on tapered boards, can be secured thereto much more rigidly, is useful in supplying a constant spring tension capable of contraction with the drying of the pelt, and is capable also of a wide range of sizes, and furtheremore the entire frame can be cleaned, steamed, sterilized or the like without injury, if desired. For this purpose we desire to make the frame of non-corrosive spring metal of any suitable composition, construction, strength and size.

Our invention is further described and defined in the form of claims as follows:

1. A skin stretching frame of the kind described, comprising movable side arms united at an apex, a cross-bar slidable upon said side arms, and capable of being locked thereto, in combination with means on said cross-bar to hold and secure a portion of a pelt applied to the frame, the means on the cross-bar to lock the same to said side arms comprising a pair of pivoted notched locking arms.

2. A skin stretching frame of the kind described, comprising side arms movable toward and away from each other about one end portion thereof, a cross-bar assembled with said side arms for holding said arms apart and being slidable relatively to said arms both longitudinally thereof and crosswise thereto, side arm engaging means assembled with said cross-bar for locking said cross-bar to said arms in adjusted position, and means on said cross-bar for securing a skin thereto.

3. A skin stretching frame of the kind described, comprising a rod bent to form a substantially V-shaped frame having side arms movable toward and away from each other about the apex of said V, a cross-bar assembled with said side arms for holding said arms apart and being slidable relatively to said arms both longitudinally thereof and crosswise thereto, side arm engaging means assembled with said cross-bar for locking said cross-bar to said arms in adjusted position, and means on said cross-bar for securing a skin thereto.

4. A skin stretching frame of the kind described, comprising side arms movable toward and away from each other about one end portion thereof, a cross-bar assembled with said side arms for holding said arms apart, said cross-bar being slidably adjustable relatively to both said arms longitudinally thereof and slidably adjustable crosswise relatively to at least one arm, side arm engaging means assembled with said cross-bar for locking said cross-bar to said arms in adjusted position, and means on said cross-bar for securing a skin thereto.

5. A skin stretching frame of the kind described, comprising a rod bent to form a substantially V-shaped frame having side arms movable toward and away from each other about the apex of said V, a cross-bar assembled with said side arms for holding said arms apart, said cross-bar while assembled with said side arms being adjustable both relatively to both said arms longitudinally thereof and crosswise relatively to at least one arm, side arm engaging means assembled with said cross-bar for locking said cross-bar to said arms in adjusted position, and means on said cross-bar for securing a skin thereto.

6. A skin stretching frame of the kind described, comprising side arms movable toward and away from each other about one end portion thereof, a cross-bar assembled with said side arms for holding said arms apart, said cross-bar being slotted for permitting said arms to pass through said bar and for permitting said bar while assembled with said side arms to be adjusted relatively to said arms both longitudinally thereof and crosswise thereto, and side arm engaging means carried by said cross-bar for locking said bar to said arms in adjusted position.

7. A skin stretching frame of the kind described, comprising side arms movable toward and away from each other, a cross-bar member assembled with said side arms for holding said arms apart, said cross-bar member being slotted for permitting said arms to pass therethrough and for permitting said cross-bar member to be adjusted relatively to said side arms both longitudinally thereof and crosswise thereto, means carried by said cross-bar member for locking it to said arms in adjusted positions comprising a side arm engaging member on said cross-bar member movable relatively thereto and notches formed on said side arm for engaging one of said members.

8. A skin stretching frame of the kind described, comprising side arms movable toward and away from each other about one end portion thereof, a cross-bar for holding said arms apart and being slidable relatively to said arms both longitudinally thereof and crosswise thereto, means for locking said cross-bar to said arms in adjusted position, means on said cross-bar for securing a skin thereto, said means comprising a clamping member arranged lengthwise of said cross-bar and movably secured thereto, and means for detachably securing an end portion of said member to said cross-bar.

9. A skin stretching frame of the kind described, comprising side arms movable toward and away from each other about one end portion thereof, a cross-bar for holding said arms apart and being slidable relatively to said arms both longitudinally thereof and crosswise thereto, means for locking said cross-bar to said arms in adjusted position, means on said cross-bar for securing a skin thereto, said means comprising a clamping member arranged lengthwise of said cross-bar and movably secured thereto, and means for detachably securing an end portion of said member to said cross-bar comprising means including a series of notches for holding said member in adjusted positions relatively to said cross-bar.

10. A skin stretching frame of the kind described, comprising side arms movable toward and away from each other about one end portion thereof, a cross-bar for holding said arms apart and being slidable relatively to said arms both longitudinally thereof and crosswise thereto, means for locking said cross-bar to said arms in adjusted position, means on said cross-bar for securing a skin thereto, said means comprising a clamping member arranged lengthwise of said cross-bar, and means for securing said member to said cross-bar in adjusted positions for clamping a skin between said bar and member.

In testimony whereof we have signed our names to this specification.

ERNEST V. SHALEN.
KARL R. OLOFSSON.
BROR L. OLOFSSON.